US006542745B1

(12) United States Patent
Mottier et al.

(10) Patent No.: US 6,542,745 B1
(45) Date of Patent: Apr. 1, 2003

(54) METHOD OF ESTIMATING THE SPEED OF RELATIVE MOVEMENT OF A TRANSMITTER AND A RECEIVER, IN COMMUNICATION WITH ONE ANOTHER, OF A TELECOMMUNICATION SYSTEM

(75) Inventors: David Mottier, Rennes (FR); Nicolas Voyer, Rennes (FR); Damien Castelain, Rennes (FR)

(73) Assignee: Mitsubishi Denki Kabushiki Kaisha (JP)

( * ) Notice: Subject to any disclaimer, the term of this patent is extended or adjusted under 35 U.S.C. 154(b) by 0 days.

(21) Appl. No.: 09/496,463

(22) Filed: Feb. 2, 2000

(30) Foreign Application Priority Data

Feb. 8, 1999 (FR) .............................. 99 01538

(51) Int. Cl.$^7$ ................................ H04Q 7/20
(52) U.S. Cl. .................... 455/441; 455/422; 455/436; 455/455; 455/504; 455/505; 455/67.6
(58) Field of Search ................ 455/422, 436, 455/441, 455, 504, 505, 67.6

(56) References Cited

U.S. PATENT DOCUMENTS

| 5,396,253 A | * | 3/1995 | Chia ........................ 342/104 |
| 6,317,612 B1 | * | 11/2001 | Farsakh ..................... 370/329 |
| 6,377,813 B1 | * | 4/2002 | Kansakoski et al. ........ 370/335 |
| 6,400,310 B1 | * | 6/2002 | Byrnes et al. .............. 342/104 |

FOREIGN PATENT DOCUMENTS

| EP | 0 639 930 A2 | 3/1994 |
| WO | WO 93/00777 A1 | 1/1993 |

OTHER PUBLICATIONS

Kofi D. Anim–Appiah, "On generalized Covariance–based Velocity Estimation," IEEE Transaction on Vehicular Technology, vol. 48, No. 5, Sep. 1999.*
M. Austin et al., "Velocity Adaptive Handoff Algorithms for Microcellular Systems" IEEE Transactions on Vehicular Technology, Aug. 1994, pp. 549–561, v. 43, n. 3, New York, USA.

* cited by examiner

*Primary Examiner*—Vivian Chin
*Assistant Examiner*—Sujatha Sharma
(74) *Attorney, Agent, or Firm*—Rothwell, Figg, Ernst & Manbeck

(57) ABSTRACT

A method and apparatus for estimating the speed of relative movement of a transmitter and a receiver which are in communication with each other in a telecommunications system. The transmitter and receiver are in communication via a channel of the telecommunications system by a carrier wave. An analysis is made of the variations of amplitude or power of the signal transmitted by the transmitter and the channel between the transmitter and the receiver. The dopler shift undergone by the carrier wave is deduced from the variations, and the speed of movement is thereby deduced.

26 Claims, 3 Drawing Sheets

METHOD OF ESTIMATING THE SPEED OF RELATIVE MOVEMENT OF A TRANSMITTER AND A RECEIVER, IN COMMUNICATION WITH ONE ANOTHER, OF A TELECOMMUNICATION SYSTEM

The present invention concerns a method of estimating the speed of relative movement of a transmitter and a receiver, in communication with one another, of a telecommunications system, such as a wireless cellular network. The transmitter (or the receiver) which is moving is accommodated in a mobile station and the receiver (or the transmitter) is accommodated in a base station of a telecommunications system.

In such a system, the telecommunications are performed by radio link, thus allowing the mobile stations to communicate while moving. However, the effect of movement of a mobile station in the process of communication is generation of a disturbance referred to as a Doppler shift which affects the transmission of the information. The degradation brought about by the Doppler shift is a direct function of the speed of movement of the mobile station.

For both the base station and the mobile station, the fact of knowing the speed of movement of the mobile station can make it possible to optimize the transmission parameters and adjust the signal processing functions used in the process of communication according to the movement of the mobile.

The aim of the invention is to propose a method which makes it possible to estimate the speed of movement of a mobile station of a telecommunications system by processing the signals transmitted between the transmitter and the receiver.

To that end, an estimation method according to the invention is characterised in that it consists of analyzing the variations, in the channel between the transmitter and the receiver, of the amplitude or of the power of the signal transmitted by the transmitter, and of deducing, from the said variations, the Doppler shift undergone by the carrier wave and from that, the said speed of movement. The said analysis consists advantageously of an evaluation of the statistical and/or spectral properties of the variations of the power of the said channel.

According to another characteristic of the invention, the said estimation method consists of determining, for one instant and for a predetermined number of delays, the autocovariance of the channel power taken at the said time and a time delayed with respect to the time by the said delay, of determining the delay for which the said autocovariance reaches its first minimum and of deducing the Doppler shift from the said delay.

According to another characteristic of the invention, it consists, from a sequence of N samples of the channel power, of determining a sequence of a predetermined number of estimates representing the derivative of the autocovariance of the channel power, of determining the delay for which the said derivative of the autocovariance is zero and of deducing the Doppler shift from the said delay.

According to another characteristic of the invention, the said estimation method consists of determining the power spectral density of the channel power in order to obtain a frequency spectrum of the said channel power, of determining, among the frequencies of the said spectrum, the highest frequency for which the said spectrum has a level greater than a predetermined level and of deducing the Doppler shift from the said frequency.

The present invention also concerns an estimation method as just described, of the type used in the receiver of a telecommunications system equipped with a power control system by means of which the said receiver sends, to the transmitter, a control signal TC(n) so that the said transmitter commands its transmission power in order that the power received by the said receiver is substantially equal to a required power. The said method then consists of estimating the channel power C(n) as a function of the received power R(n), by means of the following relationship:

$$C(n) \approx R(n) - 1/(1-z^{-1}) \cdot [TC(n-x)]$$

n is the time variable, z the z-transform variable, and x the total delay between the time at which the signal transmitted by the transmitter is received by the receiver and the time at which the control signal is received by the transmitter.

The present invention also concerns an estimation method as just described, of the type used in the transmitter of a telecommunications system equipped with a power control system by means of which the said receiver sends, to the transmitter, a control signal TC(n) so that the said transmitter commands its transmission power in order that the power received by the said receiver is substantially equal to a required power. It then consists of estimating the derivative of the autocovariance Cov[C(n),C(n+i)] of the channel power by making it equal to the derivative of the autocovariance Cov[T(n),T(n+i)] of the power T(n) transmitted by the said transmitter.

$$Cov'[C(n), C(n+i)] \approx R'_T[i](n) \approx \frac{1}{N} \sum_{j=n}^{n+N-1} T(j) \cdot \Delta T(j+i)$$

for $0 \le i \le i_{max}$ where $\Delta T(j+i) = T(j+i+1) - T(j+i)$.

The present invention also concerns an estimation method of the type used in the receiver of a telecommunications system which is not equipped with a power control system. It then consists of estimating the variations in the channel power as being equal to the variations in the power received by the said receiver.

The present invention also concerns an estimation method as just described and which is used between a fixed station and a mobile station communicating with one another in both an inbound direction and an outbound direction. It then consists, in order to determine the said Doppler shift, of estimating, using one of the methods described previously, the Doppler shift of each of the inbound and outbound channels and of combining the said shifts, for example, by a weighted summation.

The present invention also concerns a receiver of a telecommunications system provided to be capable of entering into communication with a transmitter, the said receiver having a unit for measuring the power it receives from a transmitter by means of a channel, a unit for comparing the said received power with a required power and for transmitting a control signal to the said transmitter so that it commands its transmission power so that the power received by the said receiver is substantially equal to the said required power.

According to another characteristic of the invention, the said receiver also has a unit for estimating the power of the said channel from the information concerning the received power and from the control signal, and a unit which, on the basis of the estimate of the channel power delivered by the unit, delivers a Doppler shift estimation signal.

The present invention also concerns a transmitter of a telecommunications system provided to be capable of entering into communication with a receiver, the said transmitter receiving, from the said receiver with which it is in communication, a control signal, and commanding its transmission power in order that the power received by the said receiver is substantially equal to a required power.

According to another characteristic of the invention, it has a unit which delivers a Doppler shift estimation signal on the basis of a signal relating to the power transmitted by the said transmitter.

The characteristics of the invention mentioned above, as well as others, will emerge more clearly from a reading of the description produced with reference to the accompanying drawings, among which:

In the remainder of the description, quantities which vary with the time t will be used. However, the calculations which are performed for implementing the method of the invention are digital calculations, that is to say ones which use quantities which are discrete. Thus, the time t is composed of elementary time intervals which are referred to as time slots.

For this reason, when the digital time variable is expressed in a general sense, the letter n will be used, where n represents an integer number.

Also, in the remainder of the description, powers are expressed in decibels and are designated by upper case letters.

Furthermore, the z-transform will also be used. It should be noted that the z-transform of a signal taking respectively, during time slots $\{0, 1, \ldots, n, \ldots\}$, the values $\{f(0), f(1), \ldots, f(n), \ldots\}$ is the following function of the complex number z:

$$F(z) = f(0) + \frac{f(1)}{z} + \ldots + \frac{f(n)}{z^n} + \ldots$$

It should be noted that the z-transform of the x time slot delay function is the function $1/z^x = z^{-x}$.

Figure 1:
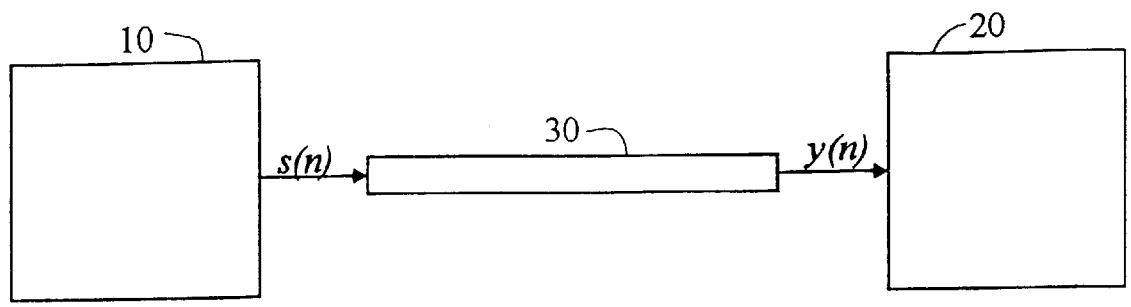
FIG. 1 depicts the block diagram of a telecommunications system to which the present invention can be applied.

The present invention can be applied to a telecommunications system of the type depicted in FIG. 1. This system has a transmitter 10, a channel 30 and a receiver 20. For example, the transmitter 10 under consideration is accommodated in a base station of a wireless telecommunications network and the receiver 20 is accommodated in a mobile station, or vice versa.

The transmitter 10 transmits, on a pulsation carrier $\omega_0$ (see Annex I) and in a time slot of index n (n is an integer), a signal s(n) whose transmission power T(n) is, in the channel 30, subject to a power modification C(n) which varies with time. The receiver 20 thus receives a signal y(n) whose power R(n) is given, if it is considered that all power quantities are expressed in decibels, by the sum of the power T(n) transmitted by the transmitter 10 and the power modification C(n) in the channel 30, that is the following relationship expressed in decibels:

$$R(n)=T(n)+C(n)$$

Subsequently, the power modification C(n) is referred to as the power of the channel 30.

According to the present invention, estimation of the speed of relative movement of the transmitter 10 and the receiver 20 consists of analyzing the variation, in the channel 30 between the transmitter 10 and the receiver 20, of the power C(n) (whether or not expressed in decibels) or of the amplitude of the signal transmitted by the said transmitter 10, and of deducing from the said analysis the Doppler shift $\omega_d(n)$ undergone by the pulsation carrier $\omega_0$ and, from that, the said speed (see Annex I).

The said analysis consists of an evaluation of the statistical and/or spectral properties of the variations in the power C(n) of the said channel 30.

It should be noted that, in the particular case of the telecommunications system depicted in FIG. 1 which does not have a system for controlling the power received by the receiver 20, and making the assumption that the power T(n) of the signal transmitted by the transmitter 10 is invariant over time, the variations in power of the channel C(n) are also the variations in the received power R(n) of the signal y(n) received by the receiver 20.

According to the invention, determination of the Doppler shift (denoted $\omega_d(n)$) due to the movement of the mobile is performed, at each instant n, by determining, as a function of a delay i, the autocovariance of the channel power C(n) due to the channel 30 between the transmitter 10 and the receiver 20 and taken at a time n and a time n+i delayed with respect to the time n by the said delay i, determining the delay $i_0(n)$ for which the autocovariance reaches its first minimum and deducing therefrom the Doppler shift $\omega_d(n)$.

It should be noted that the autocovariance of the channel power C(n) taken at a time n and a time n+i delayed by the said delay i is given by the expression:

$$Cov[C(n),C(n+i)]=R_{C(n)}[i]-E[C(n)]^2$$

Or:

$$Cov[C(n),C(n+i)]=E[C(n),C(n+i)]-E[C(n)]^2$$

In these expressions, E is the mathematical expectation and $R_{C(n)}$ is the autocorrelation function of the channel power C(n). It has been possible to show [see Annex I] that the Doppler shift $\omega_d(n)$ is given by the following simplified relationship:

$$\omega_d(n)=K/[i_0(n)T_b]$$

Where K is a constant which is theoretically equal to 3.8317.

As will be seen subsequently, the Doppler shift $\omega_d(n)$ will be deduced from the value of the delay $i_0(n)$, for example by considering an empirical value of the constant K or, for example again, by means of a table giving the Doppler shift $\omega_d$ corresponding to each delay $i_0$.

It is known that determining the delays for which the autocovariance $Cov[C(n),C(n+i)]$ has minima and maxima consists of looking for the values of the delay i for which the derivative of the autocovariance is zero.

It has also been possible to show (see Annex II) that determining the position of the first non-null extremum of the covariance at the instant n amounts to determining the position of the first non-null extremum of the autocorrelation function $R_{c(n)}[i]$, that is to say the delay $i_o$ for which its derivative is zero:

$$\frac{\partial}{\partial i}(R_{C(n)}[i_0]) = 0$$

It has been possible to show (see also Annex II) that this amounts to determining $i_0(n)$ such that:

$$\sum_{j=n}^{n+N-1} C(j) \cdot \Delta C(j + i_0(n)) = 0$$

For example, in order to determine the delay $i_0(n)$ which is the smallest positive non-null number such that the derivative of the autocorrelation $R_{C(n)}[i_0(n)]$ is null, two consecutive delays a and b are determined such that the derivatives of the autocorrelation for these two delays are of opposite sign:

$$\frac{\partial}{\partial i}(R_{C(n)}[a]) \text{ and } \frac{\partial}{\partial i}(R_{C(n)}[b]) \text{ of opposite sign}$$

Two consecutive integers a and b are therefore sought such that:

$$\frac{\partial}{\partial i}(R_{C(n)}[a]) \cdot \frac{\partial}{\partial i}(R_{C(n)}[b]) \leq 0$$

$$\Leftrightarrow \left\{\sum_{j=n}^{n+N-1} C(j) \cdot \Delta C(j+a)\right\} \cdot \left\{\sum_{j=n}^{n+N-1} C(j) \cdot \Delta C(j+b)\right\} \leq 0$$

where $b = a + 1$

Then, having determined a and b,: $i_0(n)$ is calculated by linear interpolation, that is:

$$i_0(n) = \frac{\left\{\sum_{j=n}^{n+N-1} C(j) \cdot \Delta C(j+b)\right\} \cdot a - \left\{\sum_{j=n}^{n+N-1} C(j) \cdot \Delta C(j+a)\right\} \cdot b}{\sum_{j=n}^{n+N-1} C(j) \cdot (\Delta C(j+b) - \Delta C(j+a))}$$

As will be understood according to Annexes I and II, the method of the present invention described here is based on the assumption of propagation of the signal in a set of paths which have been subject to the same single propagation delay τ. In reality, the propagation of the signal is carried out by means of multiple paths arriving at the receiver at different instants. The method of the invention then accounts for a mean Doppler shift.

Figure 2:
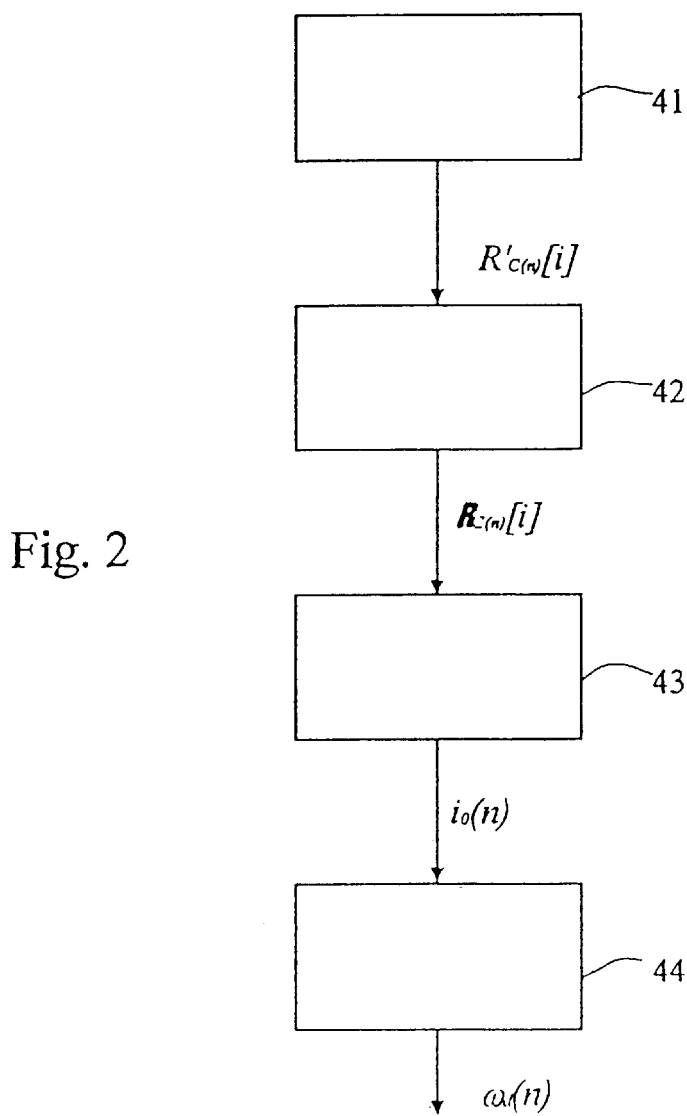
FIG. 2 is a diagram which illustrates the different steps of a method according to the present invention.

FIG. 2 depicts a block diagram of a method of the invention which is thus broken down into four consecutive step's.

At step 41, for an instant n, from a sequence of N samples of the channel power C(n) and for each delay i with values between a null value (i=0) and a predetermined maximum value (i=$i_{max}$), an estimate $R'_{C(n)}[i]$ of the derivative of the autocorrelation of the power C(n) of the go channel 31 is calculated. Such an estimate of the derivative of the autocovariance of the channel power can be written [see Annex II]

$$Cov'[C(n), C(n+i)] = R'_{C(n)}[i] \approx \frac{1}{N} \sum_{j=n}^{n+N-1} C(j) \cdot \Delta C(j+i)$$

for $0 \leq i \leq i_{max}$

The value taken by the parameter N of the number of samples analyzed for each estimate must provide a compromise between, on the one hand, a sufficiently large number of samples in order to be able to effect a correct mean of the result and, on the other hand, a small number in order to be able to consider that this result must correspond to a single Doppler shift, that is to say to a null acceleration of the mobile.

If the speed of movement of the mobile is constant, then the greater the increase in the number of samples N, the more reliable is the estimate performed at step 41. However, the delay introduced by the calculation of this estimate also increases since this delay is equal to the product of the duration of one time slot and the number of samples N.

On the other hand, if the speed of movement of the mobile is variable, the number of samples N should be chosen so that the speed of movement of the mobile can be considered as constant during the calculation time.

For example, for the UMTS standard, the structure of the time slots makes it possible to deliver a closed-loop power control signal TC(n) every 0.625 ms. The samples of the channel power C(n) are, therefore updated every 0.625 ms. The delay introduced by the calculation is then 0.625×N ms.

In practice, it can be considered that the speed of movement of a mobile does not vary significantly (variations less than 10 km/h) during a period of 0.5 seconds, that is around 800 time slots in the UMTS system. This approximation can be applied to movement by train, by car, by bicycle or on foot. Applied to the UMTS standard, this approximation therefore consists of considering that 800 consecutive time slots are subject to the same Doppler shift.

Nevertheless, in practice, using 800 samples makes the estimate of the derivative of the autocovariance sensitive to instantaneous disturbances. In order to get rid of these disturbances, it may be necessary to smooth the estimate using low-pass filtering (see step 42).

The number of samples N in the analyzed sequence is for example adjustable according to the presumed range of the relative speed of the transmitter 10 and the receiver 20, and/or the presumed range of the relative acceleration of the transmitter 10 and the receiver 20. It can also be adjustable according to the regularity of transmission of the power control command signals.

The value $i_{max}$ of the maximum delay to be processed must allow detection of the first change of slope of the covariance function Cov[C(n),C(n+i)].

The choice of its value depends on the application context. This value is for example adjustable according to the presumed range of the relative speed of the transmitter 10 and the receiver 20, and/or according to the presumed range of the relative acceleration of the transmitter 10 and the receiver 20 and/or according to the regularity of transmission of the power control command signals TC(n).

It should be noted that, within the context of UMTS, in order to guarantee the presence in the interval [0, $i_{max}$] of the delay $i_0$ corresponding to the extremum of the covariance function, the setting $i_{max}$=50 time units can be used.

In order to get rid of the estimation noise present in the estimate of the derivative $R'_{C(n)}[i]$ of the autocovariance calculated at step 41, a filtering step 42 can be provided, delivering, for each delay i, a filtered value $\boldsymbol{R}_{C(n)}[i]$.

This filtered value $\mathbf{R}_{C(n)}[i]$ can for example be written:

$\mathbf{R}_{C(n)}[i]=(1-\alpha).\mathrm{R'}_{C(n)}[i]+\alpha.\mathbf{R}_{C(n)}[i-1] \forall i>0$, and $\mathbf{R}_{C(n)}[0]=(1-\alpha).\mathrm{R'}_{C(n)}[0]$ where $\alpha$ is a forgetting factor.

Typically, $\alpha=0.9$ provides a good level of filtering.

The forgetting factor $\alpha$ can be adjustable according to the presumed noise level of the transmission of the channel 30 between the transmitter 10 and the receiver 20 or according to the quality of the evaluation of the signal to interference ratio necessary for the closed-loop power control process.

The number N of samples in the said analyzed sequence and the value of the parameter $i_{max}$ can also be adjustable according to the value taken by the forgetting factor ($\alpha$).

After filtering, the larger the forgetting factor $\alpha$, the greater the variations in the autocovariance with respect to the delay i. It can be verified that there is always a bijection between the Doppler shift $\omega_d(n)$ (that is to say the speed of movement of the mobile) and the delay $i_0(n)$ after filtering.

It should be noted that step 42 is optional.

At step 43, the delay $i_0(n)$ is determined for which the value of the estimate of the derivative of the autocovariance calculated at the previous step 42 (or at step 41 if step 42 is not present) is zero.

The search for this delay $i_0(n)$ is for example implemented in the manner already explained above.

From the $i_{max}+1$ samples $\mathbf{R}_{C(n)}[0]$ to $\mathbf{R}_{C(n)}[i_{max}]$ available, there are determined, at step 43, the consecutive delay values a and b between which the change of sign of the estimate of the derivative occurred. After linear interpolation, there is delivered, at the end of this step 43, the estimate of the delay $i_0(n)$ corresponding to the zero state of the estimate of the derivative of the autocovariance function for the sequence of N observed samples C(n).

At step 44, from the delay $i_0(n)$ corresponding to the first change of slope of the autocovariance curve, there is delivered an estimate of the Doppler shift $\omega_d(n)$ corresponding to the observation sequence at time n. One possible method consists of using a table effecting a correspondence between the possible delays and the associated Doppler shifts (that is to say the speeds). A second possible method consists of using an empirical relationship of the form of one of the relationships described above:

$$\omega_d(n)=K/i_0(n)$$

where K is a constant.

The constant K in this empirical relationship is for example adjustable according to the value taken by the forgetting factor $\alpha$ of the said filter used at step 42.

It has been possible to show that estimation of the speed of movement of the mobile is in practice possible to within about 10 km/h.

It should be noted that analysis of the variation, in the channel 30 between the transmitter 10 and the receiver 20, of the power C(n) or of the amplitude of the signal transmitted by the said transmitter 10 can also consist of an evaluation of the spectral properties of the variations of the power C(n) of the said channel 30 or of analysis of the spread of the power spectral density of the said power C(n). To do this, the said estimation method consists of determining the power spectral density of the channel power C(n) in order to obtain a frequency spectrum of the said channel power C(n), of determining, among the frequencies of the said spectrum, the highest frequency $f_0$ for which the said spectrum has a level greater than a predetermined level and of deducing the Doppler shift $\omega_d(n)$ from the said frequency $f_0(n)$.

Advantageously, the said estimation method consists of eliminating the highest frequencies of the said frequency spectrum.

There will now be described one possible example embodiment of the method according to the invention where the telecommunications system is equipped with a system for closed-loop control of the power received by the receiver such as that depicted in FIG. 3.

Figure 3:
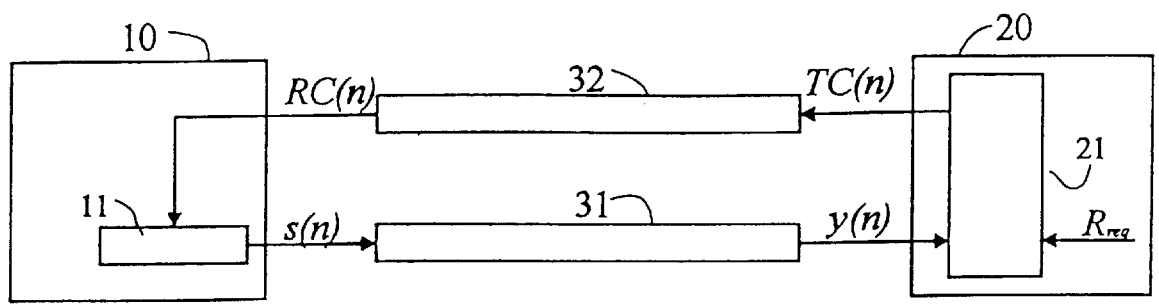
FIG. 3 depicts the block diagram of a telecommunications system to which the present invention can be applied, the said system being provided with a system for closed-loop control of the power received by the receiver.

FIG. 3 shows the elements which constitute the said system for controlling the power received by the receiver 20. This control system has, on the transmitter 10 side, a unit 11 for commanding the transmission power of the transmitter 10 and, on the receiver 20 side, a comparison unit 21 provided for performing a comparison between the power R(n) of the signal y(n) received by the receiver 20 and a required power $\mathrm{R}_{req}$.

The operation of this system is as follows. The transmitter 10 transmits, in a time slot of index n (n is an integer), a signal s(n) whose transmission power T(n) is, in a go channel 31, subject to a power modification C(n) which varies with time. The receiver 20 thus receives a signal y(n) of power R(n). The receiver 20, on the basis of the power R(n) of the received signal y(n), produces, by comparison in the unit 21 with the required power $\mathrm{R}_{req}$, a control signal TC(n) which is then transmitted, via a return channel 32, to the transmitter 10. In the return channel 32, the control signal TC(n) is subject to disturbances with the result that the signal received by the transmitter 10 is a signal RC(n).

On the basis of the control signal RC(n) which it receives, the transmitter 10 commands, by means of its unit 11, its transmission power T(n) so that the power received R(n) by the receiver 20 is, apart from errors, equal to the required power $\mathrm{R}_{req}$.

The method of the present invention can be implemented either in the transmitter 10 or in the receiver 20.

Figure 4:
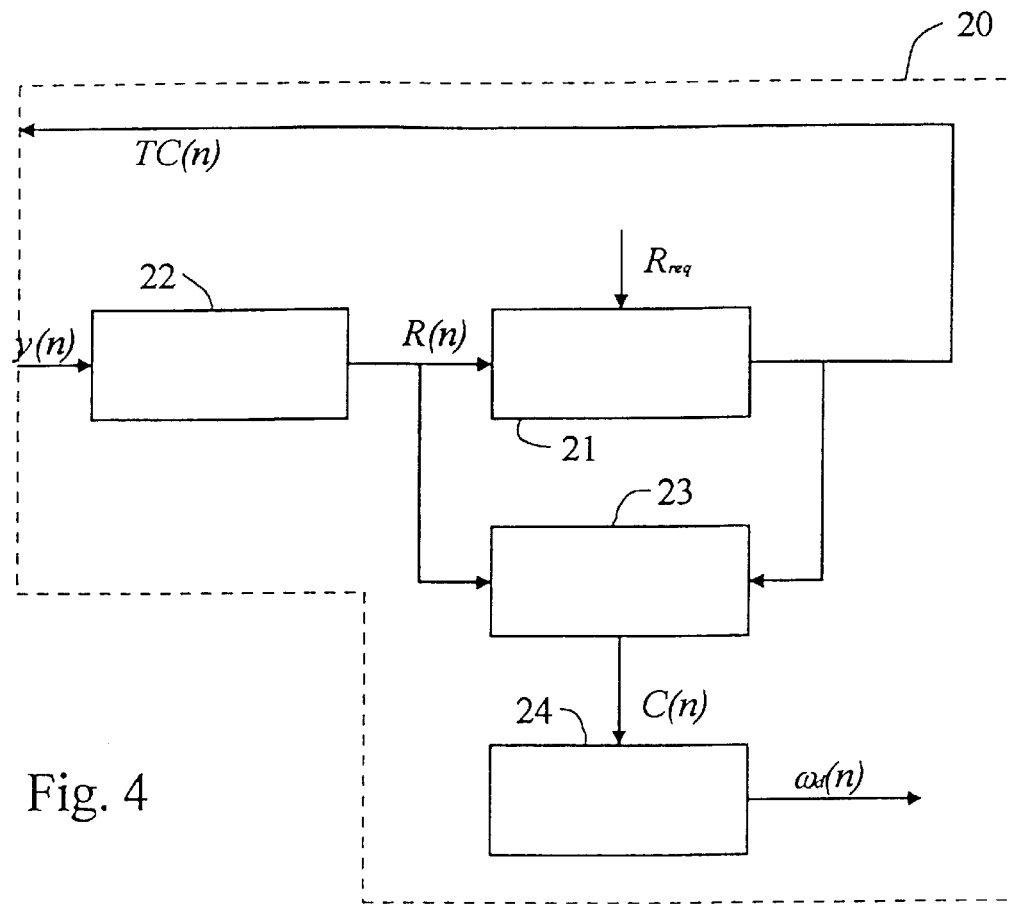
FIG. 4 is a block diagram of a receiver provided for implementing a method according to the present invention.

Such a method will be described where the said method is implemented in the receiver 20, with reference to FIG. 4 which depicts the block diagram of a receiver 20 with regard to only the functions concerning this implementation.

It includes the comparison unit 21 for comparing the power R(n) of the signal y(n) received from the transmitter 10 with a required power $\mathrm{R}_{req}$ and for generating the control signal TC(n).

It includes a unit 22 provided for measuring the power of the signal y(n) received by the receiver 20 and for delivering the result of this measurement in the form of the received power signal R(n). It should be noted that this unit 21 is for example already present in the receiver 20 for other functions and therefore will not, in practice, be duplicated for implementing the method of the present invention.

It also includes a unit 23 for estimating the channel power C(n) in the go channel 31 (see FIG. 3).

It should be noted that the channel power C(n) is, in decibels, the difference between the power received by the receiver 20 and that transmitted by the transmitter 10, themselves expressed in decibels. This therefore gives:

$$C(n)=R(n)-T(n)$$

However, according to this expression, it should be noted that the receiver 20 cannot know the exact value of the channel power C(n). The unit 23 therefore performs an estimation of the channel power C(n) by estimating the power T(n) transmitted by the transmitter 10 on the basis of the control signal TC(n).

It will be considered, for simplification, that the return channel 32 induces all x of the reaction delays between the time at which the signal transmitted s(n) by the transmitter 10 is received by the receiver 20 and the time at which the control signal RC(n) is received by the transmitter 10. The delay x is thus a total of the calculation times, the propagation times, the synchronization time, etc. It will also be considered that the errors in this return, channel 32 are given the form of an error sequence e(n). Thus, the control signal received by the transmitter 10 RC(n) can be written in the following way as a function of the control signal TC(n) transmitted by the receiver 20:

$$RC(n)=TC(n-x)+e(n)$$

In the transmitter 10, the unit 11 commands the transmission power T(n) from the received control signal RC(n).

If the receiver 20 has control over the power control of the transmitter 10, the control signal TC(n), which has a discrete value, is in reality a power control command signal TPC(n) quantized over Q bits, which corresponds to the number of decibels according to which the receiver 20 estimated it was necessary to increase or decrease the power T(n) transmitted by the transmitter 10. The relationship which defines the updating of the power T(n) can then be written:

$$T(n)=T(n-1)+RC(n)=1/(1-z^{-1}).[TPC(n-x)+e(n)]$$

And, neglecting the transmission errors e(n) on the return channel 32, this gives:

Consequently, the power C(n) of the go channel 31 calculated by the unit 23 is given by the following relationship:

$$C(n) \approx R(n)-1/(1-z^{-1}).[TPC(n-x)]$$

If, on the other hand, the transmitter 10 has control over its own transmission power, the control signal TC(n) can be the result of a simple comparison of the power deviation noted on reception which is quantized over Q bits. The transmitter 10 then processes the power control information RC(n), by means of digital transfer function f(z) filtering, in order to evaluate a power control command signal TPC(n) to be generated for providing a constant received power level at the receiver 20. This therefore gives:

$$TPC(n)=f(z).RC(n)=f(z).[TC(n-x)+e(n)]$$

The power control command signal TPC(n) is then integrated into the calculation of the transmitted power T(n) as follows:

$$T(N)=1/(1-z^{-1}).TPC(n)$$

It can be considered that the control signal TC(n) delivered by the receiver 20 is close to the power control command signal TPC(n), apart from the delay x:

$$TPC(n) \approx TC(n-x)$$

Consequently, the channel power C(n) of the go channel 31 calculated by the unit 23 is given by the following relationship:

$$C(n) \approx R(n)-1/(1-z^{-1}).[TC(n-x)]$$

The receiver 20 also has a unit 24 which, on the basis of the estimate of the channel power C(n) delivered by the unit 23, delivers a Doppler shift estimation signal $\omega_d(n)$ for each time n. This unit 24 implements an estimation method according to the invention as described above.

There will now be described, with reference to FIG. 5, an example embodiment of the method of the invention where it takes place in the transmitter 10 of a telecommunications system equipped with a closed-loop power control system such as that depicted in FIG. 3.

The estimate of the Doppler shift within the transmitter 10, unlike the previous case, cannot be based either on the knowledge of the power C(n) brought about by the go channel 31, or on the power received by the receiver 20. On the other hand, the transmitter 10 knows precisely the power T(n) of the signal it is transmitting, wherever the management of the power control is located.

Figure 5:
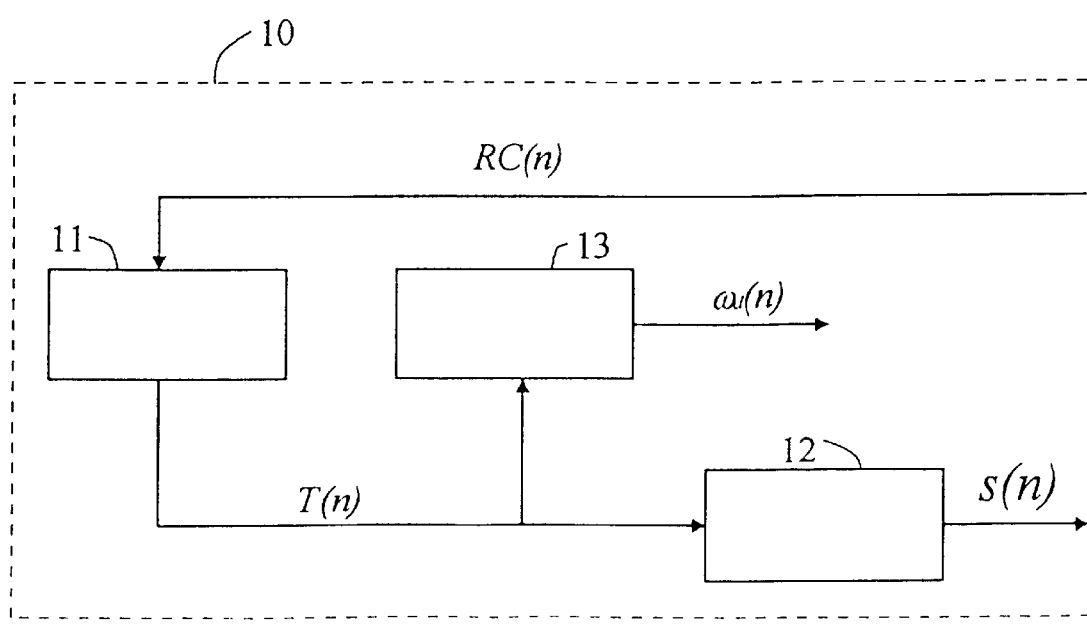
FIG. 5 is a block diagram of a transmitter which is provided to be capable of implementing a method according to the present invention.

FIG. 5 depicts the block diagram of a transmitter 10 with regard to only the functions concerning the method of the invention.

It includes the command unit 11 which, on the basis of the control signal RC(n) received from the receiver 20, delivers, to a unit 12, a power command signal T(n) so that the latter commands the power of the signal s(t) transmitted by the transmitter 10 to the value T(n).

It should be noted that the units 11 and 12 are integral parts of a closed-loop power control system such as that depicted in FIG. 3 and are not duplicated for implementing the present method.

The method of the invention is implemented in a unit 13 which then delivers the Doppler shift signal $\omega_d(n)$ at time n.

It has been possible to show (see Annex III) that, overall, in the presence of a system for controlling the received power, the autocovariance Cov[T(n),T(n+i)] of the transmitted power T(n) can be considered as a good approximation of the autocovariance Cov[C(n),C(n+i)] of the power C(n) of the go channel 31. Consequently, an estimate can be written, for a sequence of N samples and for a delay i between 0 and $i_{max}$:

$$Cov'[C(n), C(n+i)] \approx R'_{T(n)}[i] \approx \frac{1}{N}\sum_{j=n}^{n+N-1} T(j) \cdot \Delta T(j+i)$$

for $0 \leq i \leq i_{max}$ where $\Delta T(j+i)=T(j+i+1)-T(j+i)$.

This is the function which is implemented in the unit 13 depicted in FIG. 5. Next, as previously, the first delay $i_0(n)$ is sought for which the said derivative is zero and, from this delay $i_0(n)$, the value of the Doppler shift $\omega_d(n)$ is deduced.

Figure 6:
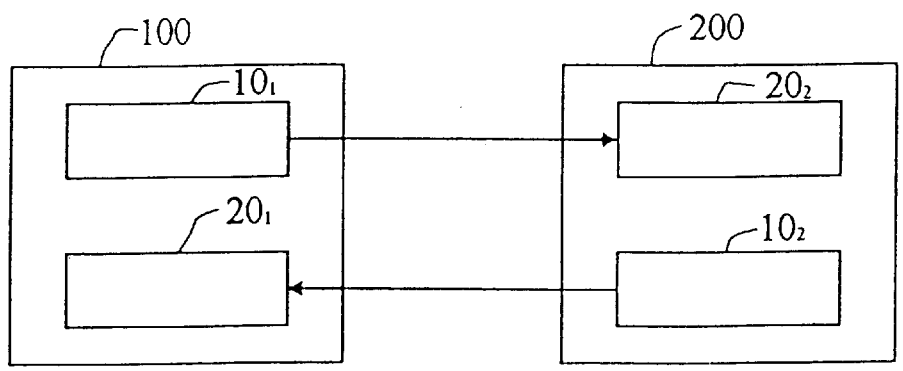
FIG. 6 is a block diagram of a telecommunications system capable of implementing a method according to the present invention.

FIG. 6 depicts a fixed station 100 composed of a transmitter $10_1$ and of a receiver $20_1$ and a mobile station 200 composed of a transmitter $10_2$ and of a receiver $20_2$.

The transmitter $10_1$ is in communication, in the so-called inbound direction, with the receiver $20_2$ and, similarly, the transmitter $10_2$ is in communication, in the so-called outbound direction, with the receiver $20_1$. In each of the inbound and outbound directions, an estimation method according to the invention can be implemented. The estimated Doppler shift values $\omega_{dm}(n)$ and $\omega_{dd}(n)$ thus estimated are then combined in order to determine an estimated value of the Doppler shift $\omega_d(n)$.

For example, this combination takes the form of a weighted sum:

$$\omega_d(n)=\alpha_1.\omega_{dm}(n)+\alpha_2.\omega_{dd}(n)$$

where $\omega_{dm}(n)$ and $\omega_{dd}(n)$ are respectively the estimated values of the Doppler shift in the inbound direction and the outbound direction and $\alpha_1$ and $\alpha_2$ are weighting coefficients.

For example, each implementation of the method of the invention in the inbound direction and in the outbound direction is carried out in the same station.

Annex I

Let the case be considered of a communication between a fixed station (for example a cellular network base station) and a mobile station moving at a speed V and transmitting, to the fixed station, a signal s(t) such that:

$$s(t)=u(t).e^{j\omega_0 t}$$

where u(t) is the amplitude of the signal to be transmitted and $\omega_0$ is the angular frequency of the Radio Frequency carrier.

As a result of obstacles, for example houses, bridges or other obstacles, which are situated between the mobile station and the fixed station, this transmitted signal s(t) propagates along different paths. Each of these paths of index i is characterised by:

an attenuation $a_i$, a random phase $\phi_i$ which follows a uniform distribution, a propagation delay $\pi_i$, and a Doppler shift $\omega_{di}$ due to the movement of the mobile station and defined as:

$$\omega_{di}=(2\pi)/\lambda \cdot V \cdot \cos(\alpha_i)$$

where $\lambda$ is the carrier wavelength, V is the speed of movement of the mobile, and $\alpha_i$ is the angle of projection of the direction of the path i on to the movement velocity vector of the mobile station.

In fact, the signal received y(t) by the fixed station is the sum of the signals received in each direction i, that is:

$$y(t)=\Sigma \alpha_i u(t-\tau_i).e^{j[\omega 0+\omega 1)(t-\tau i)+\phi 1]}$$

In practice, at each instant $\tau_k$, a set of paths considered as coming from equidistributed directions arrive at the receiver. Grouping together in the baseband model the contribution of paths which have been subject to the same propagation delay $\tau_k$, the received signal is written:

$$y(t) = \sum_k A_k(t) \cdot u(t - \tau_k)$$

The coefficients $A_k(t)$ are then assumed to follow a Rayleigh distribution whose spectral representation $A_k(f)$ is given by the relationship:

$$A_k(f) = \frac{1}{\sqrt{1-\left(\frac{f}{f_d}\right)^2}}$$

where $f_d$ is the maximum Doppler frequency defined by the relationship:

$$f_d = \frac{f_0 \cdot v_{max}}{c}$$

where $f_0$ then defines the transmission frequency, $v_{max}$ the maximum speed of the mobile and c the speed of light.

Making the assumption of a single set of paths arriving at the same instant $\tau_k$, the power received at the instant n at the receiver is denoted by:

$$c(n)=|A_k(n)|^2$$

Denoting the value of c(n) in decibels by C(n), this gives:

$$C(n)=10 \log_{10} c(n)$$

The autocovariance of the variable C(n) is defined by one of the following relationships:

$$Cov[C(n),C(n+i)]=R_{C(n)}[i]-E[C(n)]^2$$

or $$Cov[C(n),C(n+i)]=E[C(n), C(n+i)]-E[C(n)]^2$$

Where Cov is the covariance function, E the mathematical expectation and $R_C$ the autocorrelation function of the channel power.

It can be shown that the autocovariance of the variable C(n) can be written in the form:

$$Cov[C(n),C(n+i)]=\gamma^2 J_0[\omega_d(n)iT_b]^2(\Phi\{J_0[\omega_d(n)iT_b]^2, 2, 1\})$$

where $\gamma=10/\ln(10)$ $\omega_d(n)=2\pi f_d(n)$, $T_b$ is the duration of one bit, $J_0(x)$ is the Bessel function of order 0, and $$z\Phi\{z, 2, 1\} = \sum_{n=1}^{+\infty} \frac{z^n}{n^2}$$

The autocovariance Cov[C(n),C(n+i)] of the channel power expressed in decibels is thus a function of the Doppler shift $\omega_d(n)$ due to the movement of the mobile at the instant n.

Since the function $z.\Phi\{z, 2, 1\}$ is increasing, the minima (respectively the maxima) of the autocovariance Cov[C(n), C(n+i)] are the minima (respectively the maxima) of the Bessel function $J_0(x)$. The values for which the Bessel function $J_0(x)$ has minima and maxima are covered by tables. Thus, for positive values of the variable x (x>0), the first change of sign (as x increases) of the Bessel function $J_0(x)$ occurs at the value x=3.8317.

Consequently, the first minimum or maximum of the autocovariance Cov[C(n),C(n+i)] occurs for a propagation delay $i_0$ verifying the equation:

$$\omega_d i_0 T_b = 2\pi f_d i_0 T_b = 3.8317$$

Annex II

The derivative Cov'[C(n),C(n+i)] of the autocovariance Cov[C(n),C(n+i)] is written:

$$Cov'[C(n), C(n + i)] = \frac{\partial}{\partial i}(Cov[C(n), C(n + i)])$$

$$\Leftrightarrow Cov'[C(n), C(n + i)] = \frac{\partial}{\partial i}(E[C(n) \cdot C(n + i)] - E[C(n)]^2)$$

$$\Leftrightarrow Cov'[C(n), C(n + i)] = \frac{\partial}{\partial i}(E[C(n) \cdot C(n + i)])$$

$$\Leftrightarrow Cov'[C(n), C(n + i)] = \frac{\partial}{\partial i}(R_{C(n)}[i])$$

This result shows that the autocorrelation function $R_{C(n)}[i]$ is sufficient for determining the position of the first non-null extremum of the covariance Cov[C(n),C(n+i)].

However, an approximation of the autocorrelation function $R_{C(n)}[i]$ is written:

$$R_{C(n)}[i] \approx \frac{1}{N} \sum_{j=n}^{n+N-1} C(j) \cdot C(j+i)$$

Knowing furthermore that:

$$\frac{\partial}{\partial i}(R_{C(n)}[i]) \approx R_{C(n)}[i+1] - R_{C(n)}[i]$$

the following are obtained:

$$\frac{\partial}{\partial i}(R_{C(n)}[i]) \approx \frac{1}{N} \sum_{j=n}^{n+N-1} C(j) \cdot C(j+i+1) - \frac{1}{N} \sum_{j=n}^{n+N-1} C(j) \cdot C(j+i)$$

$$\Leftrightarrow \frac{\partial}{\partial i}(R_{C(n)}[i]) \approx \frac{1}{N} \sum_{j=n}^{n+N-1} C(j) \cdot (C(j+i+1) - C(j+i))$$

$$\Leftrightarrow \frac{\partial}{\partial i}(R_{C(n)}[i]) \approx \frac{1}{N} \sum_{j=n}^{n+N-1} C(j) \cdot \Delta C(j+i)$$

Finally, it can be considered that:

$$\frac{\partial}{\partial i}(R_{C(n)}[i_0]) = 0 \Leftrightarrow \sum_{j=n}^{n+N-1} C(j) \cdot \Delta C(j+i_0) = 0$$

Annex III

Let the autocovariance be considered of the power transmitted by the transmitter taken at a time n and a time n+i delayed by the said delay i and given by the expression:

$$Cov[T(n),T(n+i)]=E[T(n).T(n+i)]-E[T(n)]^2$$

Where $T(n)$ is the power transmitted by the transmitter at the instant n.

In a telecommunications system between a transmitter and receiver, the transmission power $T(n)$ of the transmitter can be written as a function of the power received $R(n)$ by the receiver and the power in the channel $C(n)$:

$$T(n)=R(n)-C(n)$$

If there exists a system for controlling the power $R(n)$ received by the receiver, the power $R(n)$ is equal to a required power $R_{req}$ apart from an error $\epsilon(n)$:

$$R(n)=R_{req}+\epsilon(n)$$

That is:

$$T(n)=R_{req}+\epsilon(n)-C(n)$$

Consequently, the autocovariance of the power transmitted by the transmitter can be written:

$$Cov[T(n),T(n+i)]=E\{(R_{req}+\epsilon(n)-C(n))\cdot(R_{req}+\epsilon(n+i)-C(n+i))\}-E[R_{req}+\epsilon(n)-C(n)]^2$$

By expanding it and applying the linearity of the mathematical expectation, the above expression becomes:

$$\begin{aligned}Cov[T(n), T(n+i)] = & E[R_{req}^2] + E[R_{req} \cdot \epsilon(n+i)] - \\ & E[R_{req} \cdot C(n+i)] + \\ & E[R_{req} \cdot \epsilon(n)] - E[R_{req} \cdot C(n)] + \\ & E[\epsilon(n) \cdot \epsilon(n+i)] + E[C(n) \cdot C(n+i)] - \\ & E[C(n) \cdot \epsilon(n+i)] - E[\epsilon(n) \cdot C(n+i)] - \\ & E[R_{req}]^2 - E[\epsilon(n)]^2 - E[C(n)]^2 - \\ & 2E[R_{req}]E[\epsilon(n)] + 2E[R_{req}]E[C(n)] + \\ & 2E[C(n)]E[\epsilon(n)]\end{aligned}$$

Knowing that the required power $R_{req}$ is constant, and considering furthermore that $E[C(n)]=E[C(n+i)]$ and that $E[\epsilon(n+1)]=E[\epsilon(n+i)]$, the following is obtained:

$$Cov[T(n),T(n+i)]=E[C(n).C(n+i)]-E[C(n)]^2+E[\epsilon(n).\epsilon(n+i)]-E[\epsilon(n)]^2-E[C(n).\epsilon(n+i)]-E[\epsilon(n).C(n+i)]+2E[C(n)]E[\epsilon(n)]$$

Finally, the following is obtained:

$$Cov[T(n),T(n+i)]=Cov[C(n),C(n+i)]+Cov[\epsilon(n),\epsilon(n+i)]-E[C(n).\epsilon(n+i)]-E[\epsilon(n).C(n+i)]+2E[C(n)]E[\epsilon(n)]$$

Making the simplifying assumption of the independence of the processes $C(n)$ and $\epsilon(n)$, the following is obtained:

$$Cov[T(n),T(n+i)]=Cov[C(n),C(n+i)]+Cov[\epsilon(n),\epsilon(n+i)]$$

where $Cov[C(n),C(n+i)]$ defines thee autocovariance of the channel power and $Cov[\epsilon(n),\epsilon(n+i)]$ the autocovariance of the noise brought about by the power control system.

Finally, making the assumption of an efficient power control system for which it can be considered that the term $Cov[\epsilon(n),\epsilon(n+i)]$ is negligible, the following is obtained:

$$Cov[T(n),T(n+i)]\approx Cov[C(n),C(n+i)]$$

Thus, in the presence of a system for controlling the received power $R(n)$, the autocovariance $Cov[T(n),T(n+i)]$ of the transmitted power $T(n)$ can be considered as a good approximation of the autocovariance $Cov[C(n),C(n+i)]$ of the power $C(n)$ brought about by the channel.

What is claimed is:

1. Method of estimating the speed of relative movement of a transmitter and a receiver in communication with one another via a channel of a telecommunications system and by means of a carrier wave, characterised in that it comprises analyzing the variations, in the channel between the transmitter and the receiver, of the amplitude or the power of the signal transmitted by the transmitter, and of deducing, from the said variations, the Doppler shift undergone by the carrier wave and from that, the said speed of movement, wherein said analysis comprises an evaluation of statistical properties, or spectral properties of variations of power of said channel, or a combination thereof, further comprising determining, for one instant (n) and for a predetermined number of delays (i), autocovariance of the channel power (C(n)) taken at said time (n) and a time (n+i) delayed with respect to the time (n) by said delay (i), of determining delay ($i_0$) for which said autocovariance reaches its first minimum and of deducing Doppler shift ($\omega_d(n)$) from said delay ($i_0$).

2. A method of estimating speed of relative movement of a transmitter and a receiver in communication with one another via a channel of a telecommunications system and by a carrier wave, comprising analyzing variations, in a channel between the transmitter and the receiver, of amplitude or power of a signal transmitted by the transmitter, and of deducing, from said variations, a Doppler shift undergone by the carrier wave and from the Doppler shift, said speed of movement, further comprising determining, for one instant (n) and for a predetermined number of delays (i), the autocovariance of the channel power (C(n)) taken at the said time (n) and a time (n+i) delayed with respect to the time (n) by the said delay (i), of determining the delay ($i_0$) for which the said autocovariance reaches its first minimum and of deducing the Doppler shift ($\omega_d$(n)) from the said delay ($i_0$).

3. Estimation method according to claim 2, characterised in that, in order to determine the delay ($i_0$(n)) for which the said autocovariance reaches its first minimum, it comprises determining, from an instant (n) and for N samples of channel power (C(n+j) with j=1 to N), the delay ($i_0$(n)) such that:

$$\sum_{j=n}^{n+N-1} C(j) \cdot \Delta C(j + i_0(n)) = 0$$

with $\Delta C(j+i_0(n))=C(j+i_0(n)+1)-C(j+i_0(n))$.

4. Estimation method according to claim 2, characterised in that, in order to determine the delay ($i_0$(n)), it comprises determining the two consecutive delays for which the respective derivatives of the autocovariance of the channel power are of opposite sign and of calculating, by linear extrapolation from the said two delays, the said delay ($i_0$).

5. Estimation method according to claim 1, characterised in that it is comprised, from a sequence of N samples of the channel power (C(n)), of determining a sequence of a predetermined number ($i_{max}$+1) of estimates each representing, for a delay (i) varying from a null value to a maximum value ($i_{max}$), the derivative (Cov'[C(n), C(n+i)]) of the autocovariance of the channel power (C(n)), of determining the delay ($i_0$(n)) for which, the said derivative of the autocovariance (Cov'[C(n), C(n+$i_0$(n))]) is zero and of deducing the Doppler shift ($\omega_d$(n)) from the said delay ($i_0$(n)).

6. Estimation method according to claim 5, characterised in that the number of samples N in the said sequence is adjustable according to the presumed range of the relative speed of the transmitter and the receiver, and/or the presumed range of the relative acceleration of the transmitter and the receiver and/or the regularity of transmission of the power control command signals.

7. Estimation method according to claim 5, characterised in that the predetermined number ($i_{max}$+1) of estimates of the derivative (Cov'[C(n), C(n+i)], i=0 to $i_{max}$) of the autocovariance of the channel power (C(n)) is adjustable according to the presumed range of the relative speed of the transmitter and the receiver, and/or the presumed range of the relative acceleration of the transmitter and the receiver and/or the regularity of transmission of the power control command signals.

8. Estimation method according to claim 5, characterised in that, in order to estimate the derivative (Cov'[C(n), C(n+i)]) of the autocovariance of the channel power (C(n)), it consists of estimating the derivative of the autocorrelation ($R_{C(n)}$[i]) of the channel power (C(n)).

9. Estimation method according to claim 5, characterised in that it comprising filtering, in a low-pass filter, the $i_{max}$+1 estimates of the derivative of the autocovariance (Cov'[C(n), C(n+i)]) or of the derivative of the autocorrelation (R'$_{C(n)}$[i]) of the channel power (C(n)) before determining the delay ($i_0$(n)).

10. Estimation method according to claim 9, characterised in that the said filter delivers, for each delay (i), a filtered value ($\mathcal{R}_{C(n)}$[i]) given by the following relationships:

$$\mathcal{R}_{C(n)}[i]=(1-\alpha)\cdot R'_{C(n)}[i]+\alpha\cdot \mathcal{R}_{C(n)}[i-1] \forall i>0,$$

and $$\mathcal{R}_{C(n)}[0]=(1-\alpha)\cdot R'_{C(n)}[0]$$

where $\alpha$ is a forgetting factor.

11. Estimation method according to claim 10, characterised in that the forgetting factor ($\alpha$) is adjustable according to the presumed noise level of the transmission of the channel or according to the result of the evaluation of the signal to interference ratio necessary for the closed-loop power control process.

12. Method of estimating the speed of relative movement of a transmitter and a receiver in communication with one another via a channel of a telecommunications system and by means of a carrier wave, characterised in that it comprises analyzing the variations, in the channel between the transmitter and the receiver, of the amplitude or the power of the signal transmitted by the transmitter, and of deducing, from the said variations, the Doppler shift undergone by the carrier wave and from that, the said speed of movement, wherein said analysis comprises an evaluation of statistical properties, or spectral properties of variations of power of said channel, or a combination thereof, further comprising determining the power spectral density of the channel power (C(n)) in order to obtain a frequency spectrum of the said channel power (C(n)), of determining, among the frequencies of the said spectrum, the highest frequency ($f_0$) for which the said spectrum has a level greater than a predetermined level and of deducing the Doppler shift ($\omega_d$(n)) from the said frequency ($f_0$(n)).

13. Estimation method according to claim 10, characterised in that the predetermined number ($i_{max}$+1) of estimates of the derivative (Cov'[C(n), C(n+i)], i=0 to $i_{max}$) of the autocovariance of the channel power (C(n)) is adjustable according to the value taken by the forgetting factor ($\alpha$).

14. Estimation method according to claim 5, characterised in that, in order to determine the delay ($i_0$), it comprises determining the two consecutive delays for which the respective derivatives of the autocorrelation of the channel power are of opposite sign and of calculating by linear extrapolation, from the said two delays, the said delay ($i_0$).

15. Estimation method according to claim 2, characterised in that the Doppler shift ($\omega_d$(n)) is determined by means of a table giving the Doppler shift ($\omega_d$) corresponding to each delay ($i_0$).

16. Estimation method according to claim 2, characterised in that the Doppler shift ($\omega_d$(n)) is determined by means of an empirical relationship of the form:

$$\omega_d(n)=K/i_0(n)$$

where K is a constant in the set of real numbers, for example adjustable according to the transmission conditions.

17. Estimation method according to claim 16, characterised in that the constant K of the said empirical relationship is adjustable according to the value taken by the forgetting factor ($\alpha$) of the said filter.

18. Estimation method according to claim 3, characterised in that it comprises determining the power spectral density of the channel power (C(n)) in order to obtain a frequency spectrum of the said channel power (C(n)), of determining, among the frequencies of the said spectrum, the highest frequency ($f_0$) for which the said spectrum has a level greater than a predetermined level and of deducing the Doppler shift ($\omega_d$(n)) from the said frequency ($f_0$(n)).

19. Estimation method according to claim 18, characterised in that it comprises eliminating the highest frequencies of the said frequency spectrum.

20. Estimation method according to claim 1, of the type used in the receiver of a telecommunications system equipped with a power control system by means of which the said receiver sends, to the transmitter, a control signal (TC(n)) so that the said transmitter commands its transmission power in order that the power received by the said receiver is substantially equal to a required power, characterised in that it comprises estimating the channel power (C(n)) as a function of the received power (R(n)), by means of the following relationship:

$$C(n) \approx R(n) - 1/(1-z^{-1}) \cdot [TC(n-x)]$$

n is the time variable, z the z-transform variable, and x the total delay between the time at which the signal transmitted by the transmitter 10 is received by the receiver 20 and the time at which the control signal is received by the transmitter 10.

21. Estimation method according to claim 1, of the type used in the transmitter of a telecommunications system equipped with a power control system by means of which the said receiver sends, to the transmitter, a control signal (TC(n)) so that the said transmitter commands its transmission power (T(n)) in order that the power received by the said receiver is substantially equal to a required power, characterised in that it comprises estimating the derivative of the autocovariance (Cov[C(n),C(n+i)]) of the channel power by making it equal to the derivative of the autocovariance (Cov[T(n),T(n+i)]) of the power (T(n)) transmitted by the said transmitter:

$$Cov'[C(n), C(n+i)] \approx R'_{T(n)}[i] \approx \frac{1}{N} \sum_{j=n}^{n+N-1} T(j) \cdot \Delta T(j+i)$$

for $0 \leq i \leq i_{max}$ where $\Delta T(j+i) = T(j+i+1) - T(j+i)$.

22. Estimation method according to claim 1, of the type used in the receiver of a telecommunications system which is not equipped with a power control system, characterised in that it comprises estimating the variations in the channel power (C(n)) as being equal to the variations in the power received (R(n)) by the said receiver 20.

23. Estimation method according to claim 1, the said method being used between a fixed station and a mobile station communicating with one another in both an inbound direction and an outbound direction, characterised in that it is comprised in order to determine the said Doppler shift, of estimating, using an estimation method according to one of claims 1 to 21, the Doppler shift of each of the inbound and outbound channels and of combining the said shifts thus obtained.

24. Estimation method according to claim 23, characterised in that the said combination is a weighted summation.

25. Receiver of a telecommunications system provided to be capable of entering into communication with a transmitter, the said receiver having a unit (22) for measuring the power it receives from a transmitter (10) by means of a channel (31), a unit (21) for comparing the said received power with a required power and for transmitting a control signal (TC(n)) to the said transmitter (10) so that it commands its transmission power (T(n)) so that the power received by the said receiver is substantially equal to the said required power, characterised in that it also has a unit (23) for estimating the power of the said channel from the information concerning the received power and from the control signal, and a unit (24) which delivers a Doppler shift estimation signal using a method of estimating speed of relative movement of a transmitter and a receiver in communication with one another via a channel of telecommunications system and by a carrier wave, comprising analyzing variations, in a channel between the transmitter and the receiver, of amplitude or power of a signal transmitted by the transmitter, and of deducing, from said variations, a Doppler shift undergone by the carrier wave and from the Doppler shift, the speed of movement, further comprising determining, for one instant (n) and for a predetermined number of delays (n), autocovariance of channel power (C(n)) taken at said time (n) and a time (n+i) delayed with respect to time (n) by said delay (i), of determining the delay ($i_0$) for which said autocovariance reaches its first minimum and of deducing Doppler shift ($\omega_d(n)$) from said delay ($i_0$).

26. Transmitter of a telecommunications system provided to be capable of entering into communication with a receiver, the said transmitter receiving, from the said receiver with which it is in communication, a control signal (RC(n)), and command its transmission power in order that the power received by the said receiver is substantially equal to a required power, characterised in that it has a unit (13) which delivers a Doppler shift estimation signal on the basis of a signal relating to the power transmitted by the said transmitter using a method of estimating speed of relative movement of a transmitter and a receiver in communication with one another via a channel of a telecommunications system and by a carrier wave, comprising analyzing variations, in a channel between the transmitter and the receiver, of amplitude or power of a signal transmitted by the transmitter, and of deducing, from said variations, a Doppler shift undergone by the carrier wave and from the Doppler shift, said speed of movement, further comprising determining, for one instant (n) and for a predetermined number of delays (i), autocovariance of channel power (C(n)) taken at said time (n) and a time (n+i) delayed with respect to time (n) by said delay (i), of determining delay ($i_0$) for which said autocovariance reaches its first minimum and of deducing Doppler shift ($\omega_d(n)$) from said delay ($i_0$).

* * * * *